Patented Dec. 18, 1934

1,984,971

UNITED STATES PATENT OFFICE 1,984,971

DESULPHURIZATION OF GASES

Paul Herold and Walter Baumann, Leuna, Germany, assignors to I. G. Farbenindustrie Aktiengesellschaft, Frankfort - on - the - Main, Germany No Drawing. Application October 23, 1931, Serial No. 570,759. In Germany October 29, 1930

5 Claims. (Cl. 23—3)

The present invention relates to improvements in the desulphurization of gases by means of active carbon.

It has already been proposed to desulphurize gases containing hydrogen sulphide, such as the gases from the distillation of coal and to recover the sulphur, by passing the gases, together with the amount of air or oxygen requisite for the oxidation of the hydrogen sulphide into sulphur over catalysts, especially active carbon, preferably in the presence of small amounts of ammonia. The oxidation to sulphur is attended with a considerable evolution of heat, which leads to a great increase in the temperature of the catalyst. It has further been proposed to carry out this process at such high temperatures that the sulphur is obtained in a molten condition. Difficulties, however, then arise owing to the fact that the molten sulphur, which is highly viscous immediately above its melting point, does not run off sufficiently fast, and clogs up the entire contact chamber, so that the resistance to the passage of the gas increases very considerably. Moreover, the molten sulphur is far more difficult to recover from the active carbon than that which is deposited at temperatures below the melting point of sulphur. Although by working at still higher temperatures, readily fluid sulphur can be obtained continuously, this proposal has failed to lead to any practicable process owing to the accurate regulation of temperature required. On the contrary it has always been found that notwithstanding suitable cooling, the process becomes impracticable when the gases contain a considerable proportion of sulphur, such as about 15 grams per cubic meter of the gas.

In the desulphurization by means of active carbon, the speed of reaction is largely dependent on the relative moisture content of the gases to be desulphurized. The relative humidity of the gases should as a rule be at least 15 to 20 per cent, in order successfully to carry through the purification. However, in the case of gases having a high content of hydrogen sulphide, such a reduction of the relative moisture content of the gases takes place by reason of the reaction heat that the catalytic reaction only proceeds very slowly and finally comes to a standstill. By reason of this fact it is practically impossible completely to desulphurize gases containing more than from 7 to 8 grams of sulphur per cubic meter in a single operation in an economical manner.

We have now found that the said process can be applied, without difficulty, even to gases containing more than 7 grams of sulphur per cubic meter (such as the waste gases from destructive hydrogenation processes and from the cracking and destructive distillation of sulphur-bearing organic substances) if the process is carried out under such precautions as to prevent the temperature from increasing more than in the treatment of gases containing up to 7 grams of sulphur per cubic meter, and as aforesaid preventing the sulphur from being heated above its melting point. According to the present invention this is effected by carrying out the usual desulphurization with air or oxygen, if desired with the addition of ammonia, in stages. The gas to be desulphurized is freed from a part of the hydrogen sulphide in the first stage, cooled, if necessary moistened, and then led over active carbon again. It is preferable to proceed so that the fraction of hydrogen sulphide oxidized in the first stage is considerably greater than those in the later stages of the purifying process.

It is usually advantageous to add the amount of air necessary for the oxidation likewise in appropriately measured portions before the single stages. The whole amount of air or oxygen may, however, be added to the gases to be desulphurized before the first stage, because a retardation of the reaction takes place by reason of the increase in temperature effected by the high content of hydrogen sulphide and therefore only a part of the oxygen is used up. The hot gases leaving the catalytic chamber are then cooled and if necessary moistened. They are then led over the active carbon in the subsequent stages with a considerably higher relative humidity than when leaving the first stage, whereby the unused oxygen still contained in the gases effects the further desulphurization.

In the case of gases having a hydrogen sulphide content of from about 15 to 20 grams per cubic meter, a complete purification from hydrogen sulphide may be effected in this manner even by two stages, while in the case of gases having still higher hydrogen sulphide contents the process is preferably carried out in three or more stages.

When exhausted, the laden active carbon is regenerated by the extraction of the sulphur with a suitable solvent. By desulphurizing in stages according to the present invention, the active carbon in the last stage is less affected and is therefore still active when the active carbon in the first stage is already exhausted and must be regenerated. After regenerating the active carbon of the first stage, the gas stream is therefore preferably passed in the reverse direction through the container so that the crude gas first comes into contact with partially laden active carbon.

The oxidation of the hydrogen sulphide can be facilitated in any known or suitable manner by the presence of basic substances. In particular a small proportion of basic nitrogen compounds which may be solid or volatile, as for example ammonia or ammonium carbonate constitutes a suitable addition either to the gases or to the contact mass. Use may also be made of other basic substances such as sodium bicarbonate either to the gases or the contact mass.

In the desulphurization of gases which contain substances that are injurious to the catalyst, such as benzene hydrocarbons, it is often beneficial to subject the gases beforehand to a preliminary purification, for example with sulphuric acid or other suitable absorbents so as to remove the said injurious constituents.

The following example will further illustrate how this invention may be carried out in practice, but the invention is not restricted to this example.

*Example*

200 cubic meters of a cracking gas rich in hydrogen sulphide and containing 15 grams of sulphur per cubic meter are passed per hour through two iron containers each of 1 square meter cross section and each charged with 1 cubic meter of active carbon. Before entry into the first container the crude gas which is at a temperature of from 25° to 30° C., has added to it air in an amount of 4 cubic meters per hour. When the gas leaves the first container it only contains 5 grams of sulphur per cubic meter and has become heated to from 75° to 80° C. by the heat of reaction. It is cooled to about 30° C. in an interposed cooler and at the same time saturated with water vapor by rinsing with water. It then passes into the second container containing active carbon, 2 cubic meters of air and 29 liters of ammonia gas being added per hour at the same time. When leaving the second container the gas is practically free from hydrogen sulphide. After about 5 days the active carbon in the first container is exhausted. It is extracted with ammonium sulphide solution and steamed, and is then ready for further use.

A producer gas rich in hydrogen sulphide, prepared from brown coal and containing low temperature carbonization gases, in which 15 grams of sulphur are present per cubic meter, may be desulphurized practically completely in the same manner.

What we claim is:—

1. A process for the desulphurization of a gas contaminated with hydrogen sulphide and containing more than 7 grams of sulphur per cubic meter which comprises passing said gas, together with so much of an oxidizing gas as is necessary for oxidizing part of the sulphur compounds present in the gas, over active carbon while maintaining the temperature below the melting point of sulphur, cooling the gas, adding sufficient of an oxidizing gas to oxidize the remainder of the sulphur compounds present in the gas, and passing the gas again over active carbon while maintaining the temperature below the melting point of sulphur.

2. A process for the desulphurization of a cracking gas contaminated with hyrodgen sulphide and containing more than 7 grams of sulphur per cubic meter which comprises passing said gas, together with so much of an oxidizing gas as is necessary for oxidizing part of the sulphur compounds present in the gas, over active carbon while maintaining the temperature below the melting point of sulphur, cooling the gas, adding sufficient of an oxidizing gas to oxidize the remainder of the sulphur compounds present in the gas, and passing the gas again over active carbon while maintaining the temperature below the melting point of sulphur.

3. A process for the desulphurization of a brown coal producer gas contaminated with hydrogen sulphide and containing more than 7 grams of sulphur per cubic meter which comprises passing said gas, together with so much of an oxidizing gas as is necessary for oxidizing part of the sulphur compounds present in the gas, over active carbon while maintaining the temperature below the melting point of sulphur, cooling the gas, adding sufficient of an oxidizing gas to oxidize the remainder of the sulphur compounds present in the gas, and passing the gas again over active carbon while maintaining the temperature below the melting point of sulphur.

4. A process for the desulphurization of a gas contaminated with hydrogen sulphide and containing more than 7 grams of sulphur per cubic meter, which comprises passing said gas together with an oxidizing gas over active carbon while maintaining the temperature below the melting point of sulphur, cooling the gas and passing the gas again over active carbon while maintaining the temperature below the melting point of sulphur.

5. A process for the desulphurization of a gas contaminated with hydrogen sulphide and containing more than 7 grams of sulphur per cubic meter, which comprises passing said gas together with an oxidizing gas over active carbon while maintaining the temperature below the melting point of sulphur, cooling and moistening the gas and passing the gas again over active carbon while maintaining the temperature below the melting point of sulphur.

PAUL HEROLD.
WALTER BAUMANN.